UNITED STATES PATENT OFFICE.

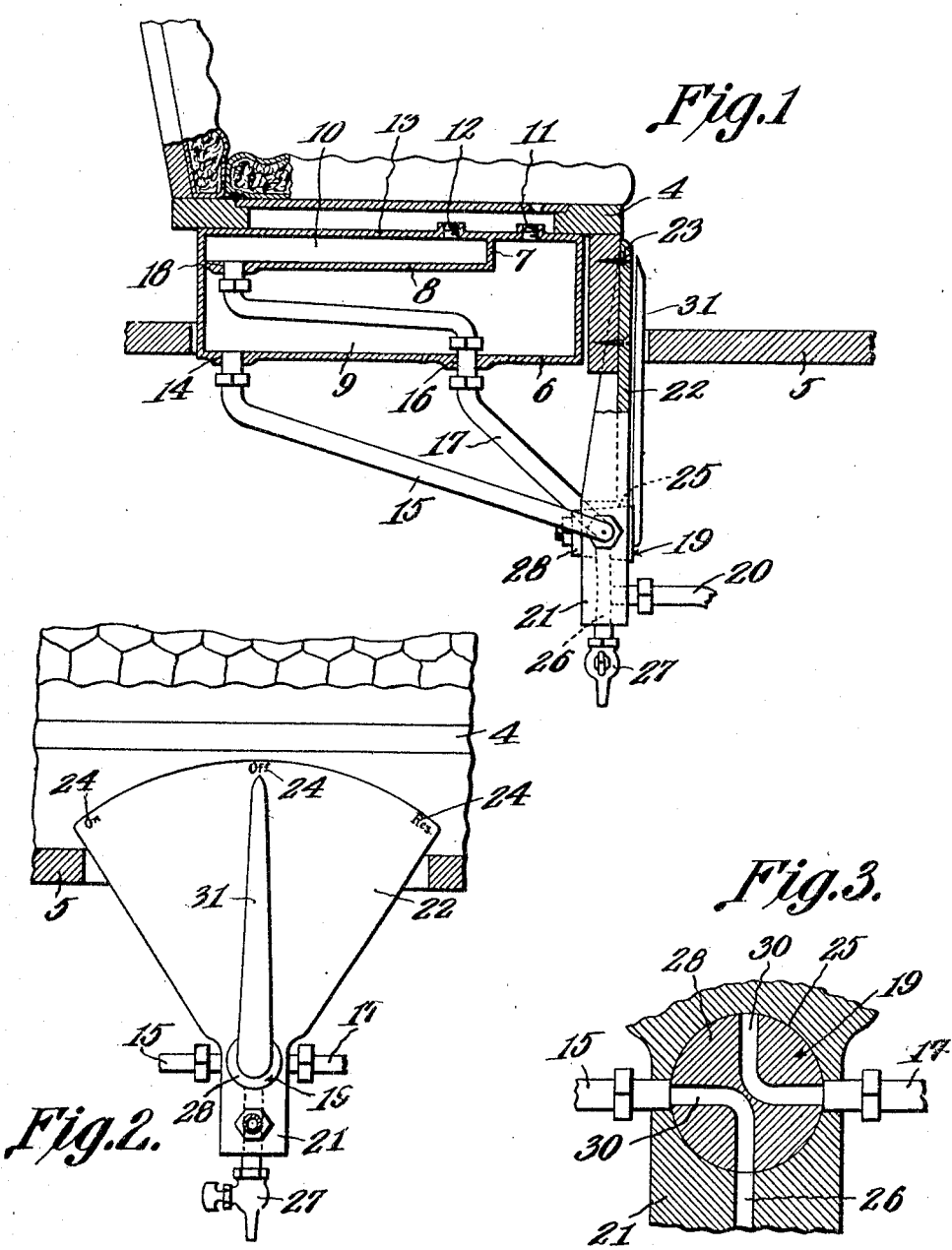

ELBERT M. STEVER, OF BRANCHPORT, NEW YORK.

FUEL-TANK FOR AUTOMOBILES.

1,097,950.  Specification of Letters Patent.  Patented May 26, 1914.

Application filed December 3, 1913. Serial No. 804,551.

*To all whom it may concern:*

Be it known that I, ELBERT M. STEVER, a citizen of the United States, residing at Branchport, in the county of Yates and State of New York, have invented a new and useful Fuel-Tank for Automobiles, of which the following is a specification.

This invention relates to improvements in fuel tanks for automobiles.

An object of the present invention is to provide a fuel tank including main and reserve compartments so that when the fuel has been exhausted from the main compartment, the fuel in the reserve compartment will be available.

A further object is to provide a reserve compartment located adjacent the top of the tank whereby fuel may be had under an extra head should the occasion so warrant.

A further object is to provide a fuel tank including a main compartment and an auxiliary or reserve compartment located adjacent the top of the tank and communicating with which are separate and independent pipes so that the fuel may be supplied to the carbureter from either of the said compartments and to provide a valve controlling the fuel supplied from the said compartments within the reach of the vehicle operator while the latter is driving the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable embodiment of my invention is illustrated, in which:—

Figure 1 is a sectional view of my improved fuel storage tank and with the accessories leading thereto, the tank being illustrated in its position beneath the vehicle seat. Fig. 2 is a front view of the same illustrating the selecting valve whereby either of the compartments of the tank may deliver fuel to the carbureter. Fig. 3 is a detail view in perspective of the selecting or controlling valve.

Referring to the drawings in which similar reference numerals designate corresponding parts throughout the several views, a vehicle seat 4 is spaced a slight or limited distance above the floor 5 and beneath which seat is located my improved fuel storage tank 6. Following the lines of the most recent automobile design, the seat has been represented as being spaced a limited distance above the floor and therefore although the carbureter is not illustrated it is to be understood that it is on about the general level with the floor 5, such being the usual construction.

The fuel storage tank 6 is provided with the partition 7 extending down from the top for some little distance and connected to which is the transverse partition 8. The partitions 7 and 8 extend the entire width of the tank and define the main compartment 9 and the auxiliary or reserve compartment 10. The main compartment is provided with the opening 11 communicating therewith and through which the fuel is introduced. A similar opening 12 is provided communicating with the auxiliary or reserve compartment 10. Thus it will be apparent that the fuel is introduced into the main and auxiliary compartments through different openings and the quantity of fuel within one compartment will be independent of the quantity of fuel within the other compartment. Attention is called to the fact that the top 13 serves as a top for both the main and auxiliary compartments.

The main compartment is provided with the outlet 14 communicating with which is the main compartment delivery pipe 15. The main compartment is provided with a second opening 16 extending therethrough and through which extends the auxiliary compartment outlet or delivery pipe 17, but which does not in any way communicate with the main compartment. The partition or bottom 8 of the auxiliary or reserve compartment is provided with the outlet 18 extending therethrough and communicating with which is the pipe 17 which extends through the main compartment 9. The main and auxiliary delivery pipes 15 and 17 lead to the selecting or controlling valve 19 by means of which either of the main or auxiliary compartments are brought into communication with a fuel supply pipe 20, which latter communicates with the carbureter.

The selecting valve 19 includes the casing 21 which as illustrated in Figs. 1 and 2, includes the upwardly extending segmental plate 22 which is secured to seat 4 by the screws 23 or other equivalent means. The segmental plate 22 is provided with the indications 24 marked thereon and which indications indicate the position of the selecting valve and which, if any, of the compartments are in communication with the fuel supply pipe. The casing is provided with the bore 25 extending therethrough communicating with which are the pipes 15 and 17 and a third pipe or opening 26. The opening 26 extends down through the lower extremity of the casing and is closed by the pet cock 27. The fuel supply pipe 20 also communicates with the opening 26 as illustrated in Figs. 1 and 2. A valve plug 28 is rotatably positioned within the valve chamber or bore 25 and is provided with the two non-communicating passages 30 which lead therethrough. The passages are adapted to bring either the pipe 15 or 17 into communication with the opening 26. It is to be noted as illustrated in Fig. 3, that when one of the pipes 15 or 17 is in communication with the opening 26, the other of the said pipes will be closed. The valve stem 31 engages the plug 28 and extends above and moves parallel to the segmental indicating and supporting plate 22. The valve stem 31 acts as a pointer, by means of which the position of the plug 28 is determined and controlled.

With the tank and selecting valve as above outlined, either of the compartments may be emptied or drained through the pet cock 27, independently of the other compartment. Also a reserve quantity of fuel may always be kept so that when steep hills or grades are encountered, and with the fuel in the main compartment at a low level, the carbureter will be raised above the general level of the liquid within the main compartment. In these instances, the valve stem is moved so that the reserve or auxiliary compartment will be brought into communication with the supply pipe 20 and due to the raised position of the compartment, fuel will be supplied to the carbureter. Also should it be desired to supply the carbureter with fuel under an increased head, the same may be accomplished by bringing the auxiliary reserve tank into communication therewith.

Another and desirable feature of the present construction arises from the independence of the tanks, namely, that different qualities of fuels may be stored and delivered to the engine when desired. Thus a powerful grade of fuel could be stored in one tank so as to impart additional power to the engine when a hill or other obstruction is encountered.

Having thus fully described my invention, what I claim to be new and original with me is:—

1. A fuel tank for apparatus of the class described, comprising a main receptacle, a partition disposed therein connected to one end wall and the side walls thereof and extending parallel to the bottom of said receptacle, a second partition connected to the first mentioned partition and to the top of said receptacle, said partitions dividing the receptacle into main and auxiliary compartments, with the auxiliary compartment at the top of said receptacle, a pipe extending through the main compartment and communicating with said auxiliary compartment, a second outlet pipe communicating with the main compartment, a fuel supply pipe, and means communicating with the fuel supply pipe and the tank outlet pipes for the selection of fuel for the said fuel supply pipe.

2. A fuel tank for apparatus of the class described, comprising a main receptacle, a partition disposed therein connected to one end wall and the side walls thereof and extending parallel to the bottom of said receptacle, a second partition connected to the first mentioned partition and to the top of said receptacle, said partitions dividing the receptacle into main and auxiliary compartments, with the auxiliary compartment at the top of said receptacle, an outlet pipe extending through the main compartment and communicating with said auxiliary compartment, a second outlet pipe communicating with the main compartment, a fuel supply pipe, means communicating with the fuel supply pipe and the tank outlet pipes for the selection of fuel for the said fuel supply pipe, and a drain pipe communicating with said fuel supply pipe and the said tank outlet pipes disposed directly therebeneath.

In testimony that I claim the foregoing as my own, I have hereto affixed my signature in the presence of two witnesses.

ELBERT M. STEVER.

Witnesses:
A. F. ROBSON,
CHAS. E. WILLIS.